Figure 3:
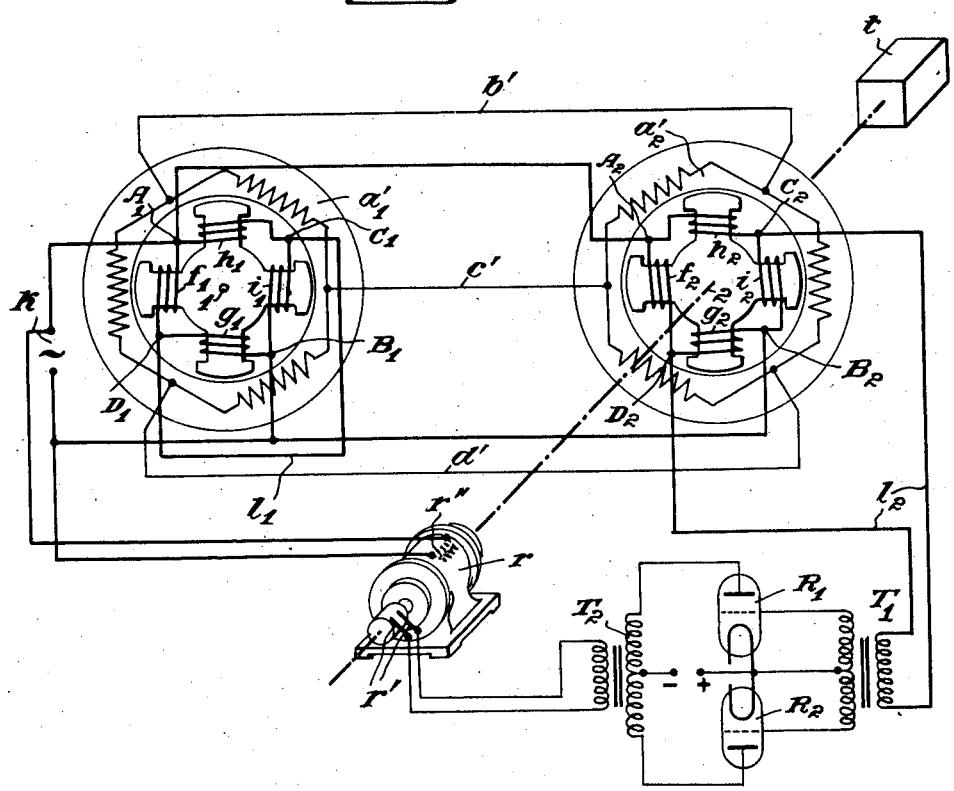

Dec. 13, 1932.  J. VOPEL ET AL  1,890,891
ELECTRICAL REMOTE CONTROL SYSTEM
Filed June 6, 1931   2 Sheets-Sheet 1
Fig. 1
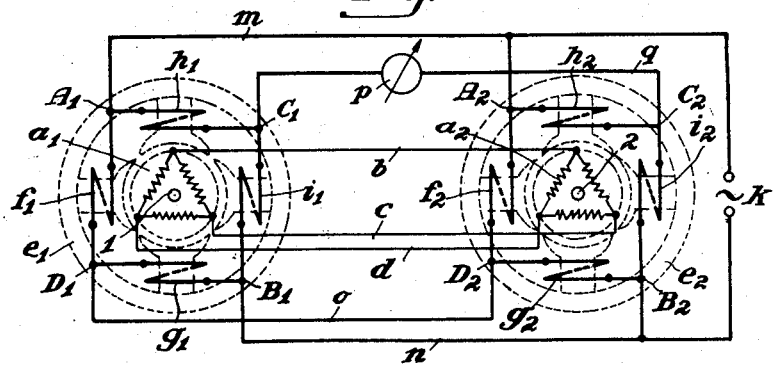
Fig. 4
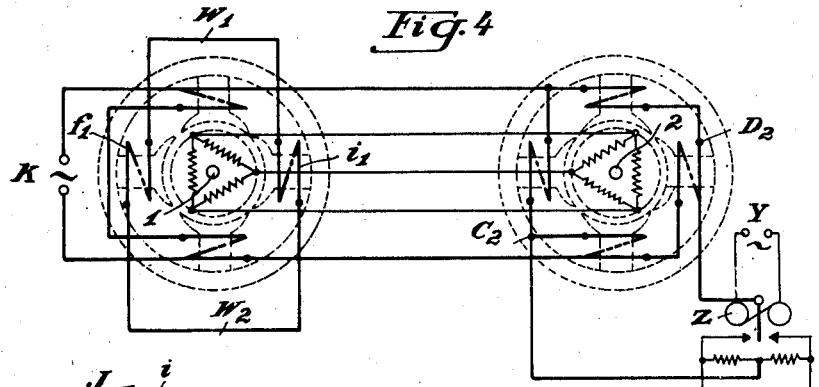
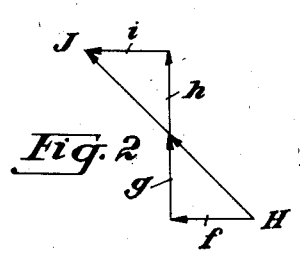
Fig. 2
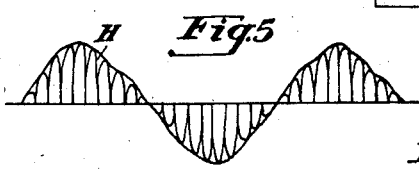
Fig. 5
Inventors
Johannes Vopel
and
Rudolf Oetker
by Lyrax Kehlenbeck
Attorneys.

Patented Dec. 13, 1932

1,890,891

UNITED STATES PATENT OFFICE

JOHANNES VOPEL, OF BERLIN-ZEHLENDORF-MITTE, AND RUDOLF OETKER, OF BERLIN, GERMANY, ASSIGNORS TO GESELLSCHAFT FÜR ELEKTRISCHE APPARATE M. B. H., OF MARIENFELDE NEAR BERLIN, GERMANY, A CORPORATION OF GERMANY

ELECTRICAL REMOTE CONTROL SYSTEM

Application filed June 6, 1931, Serial No. 542,559, and in Germany May 10, 1930.

Our invention relates to apparatus for determining and equalizing differences in the positions of two shafts located at a distance apart.

For determining and equalizing differences in the positions of two shafts located at a distance apart from each other, electrical remote indicating and controlling means with systems of motor-like construction are known which are mostly so connected that they function in the manner of electrical differential gears. Thus two transmitters coupled with the shafts to be compared are connected with an electrical differential receiver, which receives no relative adjustment as long as the positions of the two shafts coincide with each other. Within certain limits it is immaterial whether the two shafts are stationary or rotate at equal speeds. All electrical indicating or control apparatus based upon this differential principle has a number of fundamental faults which in most cases do not permit of a sufficiently accurate adjustment. These constructions call for comparatively heavy transmitters, which in addition are reactively affected by the receiver and which strongly brake the shafts capable of withstanding light loads only. Receivers of motor-like construction also have a tendency to hunt due to the flywheel effect of the mass of the armature, which fact renders them unsuitable for indication and control purposes, more particularly in the case of suddenly changing, for instance jumpy movements. It is furthermore objectionable that in the armatures of the transmitters, more particularly at higher speeds, not only the transformer voltage operative for the adjustment of the receiver or other purposes is induced, but in addition thereto a rotation voltage which causes undesirable voltage displacements and in consequence thereof wrong measuring and control results.

The object of our invention is to eliminate the drawbacks of known apparatus, and more particularly the action of the rotation voltage. For determining and equalizing the difference in the positions of two shafts located at a distance from each other there is according to our invention with each of the two shafts connected an induction regulator or rotary transformer. Both induction regulators are preferably of identical construction and each carries a winding arranged in bridge connection, which may more particularly be located upon the pairs of poles of the induction regulator mounted on a stationary pole frame. The windings of the armatures rotatable with the shafts are directly connected to each other. The complete arrangement is such that in the event of a difference in the positions of the two shafts developing the balance of both bridges is disturbed. The potential difference or the bridge balancing current thus generated is utilized for the indication and recording of the difference in the positions of the two shafts or for the control of a driving member adapted to equalize the said difference in the positions.

For recording purposes an oscillograph may be connected in the connecting lead of corresponding zero points of the bridge. For equalizing or compensating the differences in the positions of the shafts, an adjusting motor connected with one of the two shafts may be connected to the corresponding zero points of the bridge, the bridge balancing current being supplied to the motor, preferably through an amplifier arrangement.

In the drawings affixed to our specification and forming part thereof three embodiments of our invention are shown by way of example. In said drawings, Fig. 1 is a diagrammatic representation of one form of our invention; Fig. 2 is a diagram illustrating the exciting field resulting from the fields of the individual bridge arms; Figs. 3 and 4 are views of the same character as Fig. 1, showing two additional embodiments of our invention; and Fig. 5 is an example of a record or graph obtained with the oscillograph which forms part of the apparatus shown in Fig. 4. The embodiments illustrated by Figs. 1 and 4 are alike in this respect, that the windings connected in the Wheatstone bridge are located on two pairs of poles of the stator of the rotary transformer, while the rotor windings of the two rotary transformers are connected with each other. The reverse arrangement is employed in Fig. 3, where the windings connected in the Wheatstone bridge are located on two pairs of poles of the rotor of the rotary transformer, while the stator windings of the two rotary transformers are connected with each other.

Referring to Fig. 1, 1 and 2 are the two shafts located at a distance apart, and the differences in the positions of which are to be measured or determined. Upon these shafts are mounted the armatures $a_1$ and $a_2$ of two identical induction regulators or rotary transformers. The delta windings of the armatures $a_1$ and $a_2$ are connected with each other directly by the leads $b$, $c$ and $d$. The armature $a_1$ ($a_2$) is adapted to rotate in the pole frame $e_1$ ($e_2$) provided with four poles. The poles spaced apart by an angle of 90 degrees carry windings $f_1$, $g_1$, $h_1$, $i_1$ ($f_2$, $g_2$, $h_2$, $i_2$) as equal as possible in electrical value and which in groups $f_1$, $g_1$ ($f_2$, $g_2$) and $h_1$, $i_1$ ($h_2$, $i_2$) are connected in parallel to the source of alternating current $k$, the current being supplied to the bridge feeding points $A_1$ ($A_2$) and $B_1$ ($B_2$) by the leads $m$ and $n$ respectively. The zero points $D_1$ and $D_2$ of the two electromagnetic bridges are connected by the lead $o$, while to the zero points $C_1$ and $C_2$ of this bridge there is connected the current or voltage responsive measuring instrument $p$.

In the position shown the magnetic fluxes of the pairs of poles $f_1$, $i_1$ ($f_2$, $i_2$) and $g_1$, $h_1$ ($g_2$, $h_2$) close in both induction regulators or rotary transformers uniformly across the armature $a^1$ ($a_2$), as will be understood from Fig. 2 of the drawings, which fluxes are in the fields $g$, $h$, $i$, $j$, generated in the individual poles geometrically added to form the resultant or common field H J. This field traverses the armature and generates voltages in the delta windings, which however produce no balancing currents as the voltages induced in the delta windings neutralize one another. In the symmetrical construction of the systems all the poles have an equal inductive resistance so that the potential drop from $A_1$ ($A_2$) to $C_1$ ($C_2$) is as great as the potential drop from $A_1$ ($A_2$) to $D_1$ ($D_2$). The zero points $C_1$, $C_2$ and $D_1$ and $D_2$ thus have an equal potential so that the indicating instrument $p$ is not deflected. It is quite immaterial whether the shafts 1 and 2 are stationary or revolve at equal speeds, because in the latter case the rotation voltages generated neutralize each other. It is a particular advantage of our improved arrangement that even at the highest speeds the rotation voltages produce no balancing currents in the connecting leads $o$ and $q$.

If differences should develop between the positions of the shafts 1 and 2, equalizing or balancing currents will flow in the windings of the armatures $a_1$ and $a_2$ and produce armature fields perpendicular to the stator fields (H J, Fig. 2). In each of the rotary transformers, such armature field is closed through the pole shoes of the respective stator, and said armature field is resolved in such a manner that in two of the pole shoes it will extend in the same direction as the exciting flux $f$, $g$, $h$, $i$ respectively, while in the other two pole shoes the armature field will extend in the opposite direction to the exciting flux. Thus the inductances of the exciting windings situated in the Wheatstone bridges will be altered unequally, so that the currents passing from the network $k$ will now be of different strengths. This, of course, means that the bridges are no longer in equilibrium. Accordingly, balancing currents corresponding to the degree of non-correspondence between the positions of the shafts 1 and 2 will develop in the connecting leads $o$ and $q$ of the zero points $C_1$ and $C_2$ or $D_1$ and $D_2$ respectively of the bridges. The value of this difference or degree of non-correspondence in the positions of shafts 1 and 2 can be read off on the correspondingly calibrated indicating instrument $p$.

In order to reduce the number of long distance lines in cases where the distance between the two shafts are very considerable, without sacrificing the advantages of our improved arrangement described herein, the zero points of one induction regulator may be connected directly as shown at 1' in Fig. 3, or as illustrated in Fig. 4, we may provide a direct connection between the windings of two diametrically opposite poles of one induction regulator. The balancing currents corresponding with the difference in the positions of the shafts 1 and 2 are then tapped at the zero points $C_2$ and $D_2$ of the bridge of the second induction regulator and in the apparatus according to Fig. 4 employed for recording the difference in the positions and in the apparatus according to Fig. 3 for equalizing this difference.

The construction of the induction regulators or rotary transformers mounted in Fig. 3 upon the two shafts 1 and 2 is identical in principle with that according to Fig. 1.

The rotors are provided with pole shoes carrying the windings $g_1 f_1 h_1 i_1$ or $g_2 f_2 h_2 i_2$ respectively. These windings receive current from the network $k$. The zero points $C_1$ and $D_1$ of the bridge of the first induction regulator or rotary transformer, which in this arrangement serves as a transmitter, are connected directly by the conductor $1_1$, while the zero points $C_2$, $D_2$ of the bridge of the second induction regulator or rotary transformer, acting as a receiver, are connected directly by the conductor $1_2$ in which is located the primary of the transformer $T_1$. The delta-connected windings of the stators $a_1'$ and $a_2'$ are connected by the leads or conductors $b'$, $c'$, $d'$. It will be evident that in this arrangement of the two rotary transformers, as in the construction first described, there will flow in the primary of the transformer $T_1$, a current proportional to the degree of non-correspondence between the positions of the shafts 1 and 2. The voltage induced in the two secondary windings of said transformer $T_1$ is supplied to the grids of two amplifier tubes $R_1$, $R_2$, of a type well-known in the radio art, and in the output or plate circuit connections of these tubes are connected the two primary windings of another transformer $T_2$. The voltage induced in the secondary of this transformer will then be proportional to the one existing in the primary winding of the transformer $T_1$, but is greater, corresponding to such amplification, and this amplified voltage is supplied to the armature winding of the motor $r$, through brushes $r'$. The field winding $r''$ of the motor is connected with the network $k$. This motor serves for the follow-up rotation of the receiver armature and also for adjusting the heavy object $t$ connected with said armature. The arrangement is again such that as long as the position of the transmitter and that of the object $t$ to be adjusted coincide, the zero points $C_1$ and $D_1$ and $C_2$ and $D_2$ respectively of the bridges have equal potentials and the motor $r$ consequently receives no current. As soon as differences develop between the positions of the shafts 1 and 2, the balance of the bridges is disturbed and the motor receives, through the amplifying arrangement $R_1$, $R_2$, a current proportional to the balancing current of the bridges, until the motor has turned the shaft 2 and the object $t$ coupled therewith, into the position corresponding to the transmitter shaft 1, and thus has restored the balance of the bridges. In this apparatus a current or voltage responsive measuring instrument might be connected in the bridge balancing line $1_1$ which instrument if correspondingly calibrated would continually indicate at the transmitting station any differences in the position of the object to be adjusted. The deflection of this instrument would however in comparison with that according to Fig. 1 and with equal differences in the positions of the shafts 1 and 2, be only about half as great, as in the case of Fig. 3 merely the potential difference between the zero points of one of the bridges is measured.

In the arrangement illustrated in Fig. 4 the magnet coils $f_1$ and $i_1$ of the induction regulator or rotary transformer mounted upon the shaft 1 are connected directly by the lines $w_1$ and $w_2$. The bridge balancing current of the induction regulator or rotary transformer mounted on the shaft 2 here serves for recording the difference of positions between the two shafts, the oscillograph loop $x$ being connected between the two zero points $C_2$ and $D_2$ of the bridge. The balancing current is in known manner rectified by a synchronously oscillating relay $z$ connected to a source of alternating current $y$ of the same frequency and phase as the bridge balancing current, so that the oscillograph records continuously the differences of the positions as regards size and direction. An oscillation picture or graph is thus obtained, for instance one of the type shown in Fig. 5. The enveloping curve H is then the differential curve plotted in dependence of the time.

We claim as our invention:

1. An apparatus for determining and equalizing differences in the positions of two shafts located at a distance apart, comprising a rotary transformer on each of said shafts, each transformer having two relatively movable parts, four windings, in bridge connection, located on one of the parts of each rotary transformer, interconnected windings on the other part of each of said transformers, a source of alternating current connected with said bridge-connected windings, leads connecting the zero points of the bridges, and current-responsive means in said connecting leads between said zero points.

2. An apparatus for determining and equalizing differences in the positions of two shafts located at a distance apart, comprising a rotary transformer on each of said shafts, each transformer having two relatively movable parts, four windings, in bridge connection, located on one of the parts of each rotary transformer, interconnected windings on the other part of each of said transformers, a source of alternating current connected with said bridge-connected windings, leads connecting the zero points of the bridges, and voltage-responsive means in said connecting leads between said zero points.

3. An apparatus for determining and equalizing differences in the positions of two shafts located at a distance apart, comprising a rotary transformer on each of said shafts, each transformer having two relatively movable parts, four windings, in bridge connection, located on one of the parts of each rotary transformer, interconnected windings on the other part of each of said transformers, a source of alternating current connected with said bridge-connected windings, leads connecting the zero points of the bridges, and an electrical measuring instrument in said connecting leads between the zero points of the bridges, for indicating the difference between the positions of the two shafts.

4. An apparatus for determining and equalizing differences in the positions of two shafts located at a distance apart, comprising a rotary transformer on each of said shafts, each transformer having two relatively movable parts, four windings, in bridge connection, located on one of the parts of each rotary transformer, interconnected windings on the other part of each of said transformers, a source of alternating current connected with said bridge-connected windings, leads connecting the zero points of the bridges, and an electrical recording device in said connecting leads.

5. An apparatus for determining and equalizing differences in the positions of two shafts located at a distance apart, comprising a rotary transformer on each of said shafts, each transformer having two relatively movable parts, four windings, in bridge connection, located on one of the parts of each rotary transformer, interconnected windings on the other part of each of said transformers, a source of alternating current connected with said bridge-connected windings, leads connecting the zero points of the bridges, a relay, means for causing such relay to oscillate in synchronism with the alternations of the current which is supplied to said bridge-connected windings, an oscillograph, and connections, controlled by said oscillating relay, between said oscillograph and said connecting leads.

6. An apparatus for determining and equalizing differences in the positions of two shafts located at a distance apart, comprising a rotary transformer on each of said shafts, each transformer having two relatively movable parts, four windings, in bridge connection, located on one of the parts of each rotary transformer, interconnected windings on the other part of each of said transformers, a source of alternating current connected with said bridge-connected windings, leads connecting the zero points of the bridges, an electric motor coupled to one of said shafts and having two relatively rotatable parts each provided with a winding, leads connecting one of said motor windings with the said lead which connects the zero points of the bridges, and connections for supplying an alternating current to the other motor winding.

7. An apparatus for determining and equalizing differences in the positions of two shafts located at a distance apart, comprising a rotary transformer on each of said shafts, each transformer having two relatively movable parts, four windings, in bridge connection, located on one of the parts of each rotary transformer, interconnected windings on the other part of each of said transformers, a source of alternating current connected with said bridge-connected windings, leads connecting the zero points of the bridges, an electric motor coupled to one of said shafts and having two relatively rotatable parts each provided with a winding, leads connecting one of said motor windings with the said lead which connects the zero points of the bridges, and connections for supplying an alternating current to the other motor winding, and means for amplifying the currents supplied to the first-mentioned motor winding.

8. An apparatus for determining and equalizing differences between the positions of two shafts located at a distance apart, comprising a rotary transformer on each of said shafts, each transformer composed of an armature and a stator having four poles arranged in two pairs, four exciting windings, in bridge connection, located on two pole pairs of the stators of said rotary transformers, leads connecting the zero points of said bridge-connected windings, connections for supplying an alternating current to said windings, interconnected windings on the armatures of said rotary transformers, and electrical means connected with the zero points of the bridges for indicating and equalizing differences between the positions of said two shafts.

9. An apparatus for determining and equalizing differences between the positions of two shafts located at a distance apart, comprising a rotary transformer on each of said shafts, each transformer composed of a stator and a rotor having four poles arranged in two pairs, four exciting windings, in bridge connection, located on two pole pairs of the rotors of said rotary transformers, leads connecting the zero points of said bridge-connected windings, connections for supplying an alternating current to said windings, interconnected windings on the stators of said rotary transformers, and electrical means connected with the zero points of the bridges for indicating and equalizing differences between the positions of said two shafts.

In testimony whereof we affix our signatures.

JOHANNES VOPEL.
RUDOLF OETKER.